(12) United States Patent
Ganiger et al.

(10) Patent No.: US 12,066,187 B2
(45) Date of Patent: Aug. 20, 2024

(54) PLANK HANGER STRUCTURE FOR DURABLE COMBUSTOR LINER

(71) Applicant: General Electric Company, Schenectady, NY (US)

(72) Inventors: Ravindra Shankar Ganiger, Bengaluru (IN); Hiranya Nath, Bengaluru (IN)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 0 days.

(21) Appl. No.: 17/931,646

(22) Filed: Sep. 13, 2022

(65) Prior Publication Data
US 2023/0366545 A1 Nov. 16, 2023

(30) Foreign Application Priority Data

May 13, 2022 (IN) .............................. 202211027644

(51) Int. Cl.
*F23R 3/00* (2006.01)
*F02C 7/00* (2006.01)
*F23R 3/60* (2006.01)

(52) U.S. Cl.
CPC ................ *F23R 3/002* (2013.01); *F02C 7/00* (2013.01); *F23R 3/60* (2013.01); *F05D 2220/32* (2013.01); *F05D 2240/35* (2013.01); *F23R 2900/03043* (2013.01)

(58) Field of Classification Search
CPC .............. F23R 3/002; F23R 3/60; F23M 5/04
See application file for complete search history.

(56) References Cited

U.S. PATENT DOCUMENTS

| | | | |
|---|---|---|---|
| 3,736,747 A * | 6/1973 | Warren | F23R 3/04 60/730 |
| 3,737,152 A | 6/1973 | Wilson | |
| 3,793,827 A | 2/1974 | Ekstedt | |
| 3,811,276 A | 5/1974 | Caruel et al. | |
| 3,845,620 A | 11/1974 | Kenworthy | |
| 4,004,056 A | 1/1977 | Carroll | |
| 4,168,348 A * | 9/1979 | Bhangu | F23R 3/002 428/137 |
| 4,380,896 A | 4/1983 | Wiebe | |
| 5,024,058 A * | 6/1991 | Shekleton | F23R 3/002 60/800 |

(Continued)

FOREIGN PATENT DOCUMENTS

| | | |
|---|---|---|
| EP | 0905353 B1 | 1/2003 |
| EP | 2995863 B1 | 5/2018 |

(Continued)

*Primary Examiner* — Katheryn A Malatek
(74) *Attorney, Agent, or Firm* — Venable LLP; Michele V. Frank

(57) ABSTRACT

A combustor includes a skeleton mesh structure having a plurality of structural elements configured to mesh together to form the skeleton mesh structure. The combustor also includes an inner liner and an outer liner mounted to the skeleton mesh structure to define a combustion chamber. The inner liner includes a plurality of inner planks mounted to an inner side of the inner liner and a plurality of outer planks mounted to an outer side of the inner liner. The outer liner includes a plurality of inner planks mounted to an inner side of the outer liner and a plurality of outer planks mounted to the outer side of the outer liner.

20 Claims, 9 Drawing Sheets

(56) References Cited

U.S. PATENT DOCUMENTS

| | | | |
|---|---|---|---|
| 6,041,590 A * | 3/2000 | Hayton | F02K 1/822 60/766 |
| 6,155,056 A | 12/2000 | Sampath et al. | |
| 6,341,485 B1 * | 1/2002 | Liebe | F23R 3/002 60/800 |
| 6,427,446 B1 | 8/2002 | Kraft et al. | |
| 7,017,334 B2 | 3/2006 | Mayer et al. | |
| 7,152,411 B2 | 12/2006 | McCaffrey et al. | |
| 7,219,498 B2 | 5/2007 | Hadder | |
| 7,237,389 B2 | 7/2007 | Ryan et al. | |
| 7,338,244 B2 | 3/2008 | Glessner et al. | |
| 7,389,643 B2 | 6/2008 | Simons et al. | |
| 8,033,114 B2 | 10/2011 | Hernandez et al. | |
| 8,316,541 B2 | 11/2012 | Patel et al. | |
| 8,727,714 B2 | 5/2014 | Snider et al. | |
| 9,080,770 B2 | 7/2015 | Dudebout et al. | |
| 9,127,565 B2 | 9/2015 | Keller et al. | |
| 9,328,665 B2 | 5/2016 | Doerr et al. | |
| 9,341,377 B2 | 5/2016 | Kramer | |
| 9,360,217 B2 | 6/2016 | DiCintio et al. | |
| 9,612,017 B2 | 4/2017 | Vetters | |
| 9,651,258 B2 | 5/2017 | Graves et al. | |
| 9,709,280 B2 | 7/2017 | Preston, III | |
| 9,829,199 B2 | 11/2017 | Mayer | |
| 9,958,159 B2 | 5/2018 | Smallwood et al. | |
| 10,107,128 B2 | 10/2018 | Romanov et al. | |
| 10,378,767 B2 | 8/2019 | Maurer et al. | |
| 10,386,066 B2 | 8/2019 | Cunha et al. | |
| 10,422,532 B2 | 9/2019 | Sadil et al. | |
| 10,451,279 B2 | 10/2019 | Staufer | |
| 10,473,331 B2 | 11/2019 | Quach et al. | |
| 10,563,865 B2 | 2/2020 | Chang | |
| 10,598,382 B2 | 3/2020 | Tu et al. | |
| 10,648,666 B2 | 5/2020 | Bouldin et al. | |
| 10,767,863 B2 | 9/2020 | Freeman et al. | |
| 10,801,730 B2 | 10/2020 | Kramer | |
| 10,801,731 B2 | 10/2020 | Dillard | |
| 10,808,930 B2 | 10/2020 | Schlichting | |
| 10,969,103 B2 | 4/2021 | Chang et al. | |
| 11,015,812 B2 | 5/2021 | Petty, Sr. et al. | |
| 2004/0035115 A1 * | 2/2004 | Farmer | F23R 3/50 60/752 |
| 2010/0236250 A1 | 9/2010 | Headland et al. | |
| 2015/0260399 A1 | 9/2015 | Low | |
| 2016/0245518 A1 | 8/2016 | Drake | |
| 2018/0266689 A1 * | 9/2018 | Kramer | F23R 3/06 |
| 2018/0292090 A1 | 10/2018 | Dyer et al. | |
| 2018/0306113 A1 | 10/2018 | Morton et al. | |
| 2020/0116360 A1 | 4/2020 | White et al. | |
| 2020/0348023 A1 | 11/2020 | Paauwe et al. | |
| 2021/0018178 A1 | 1/2021 | Sze | |
| 2021/0102705 A1 | 4/2021 | Kramer | |
| 2021/0325043 A1 | 10/2021 | Freeman et al. | |

FOREIGN PATENT DOCUMENTS

| | | |
|---|---|---|
| EP | 2868973 B1 | 12/2018 |
| EP | 3770500 A1 | 1/2021 |
| EP | 3321586 B1 | 6/2021 |
| GB | 2432902 B | 1/2011 |

* cited by examiner

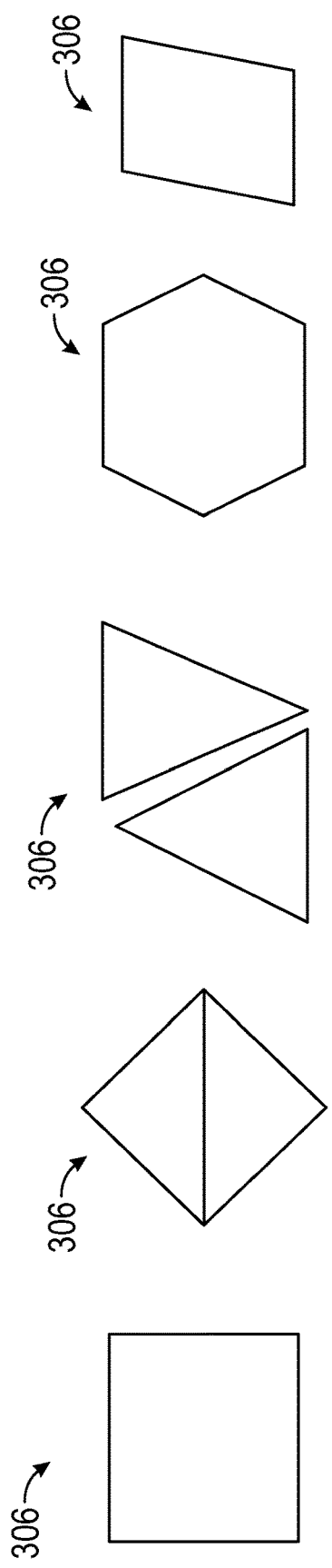
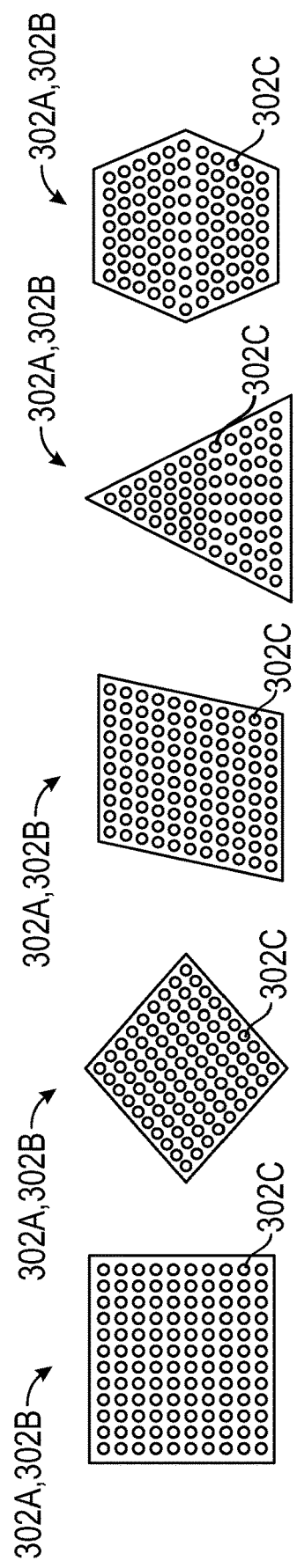

PLANK HANGER STRUCTURE FOR DURABLE COMBUSTOR LINER

CROSS REFERENCE TO RELATED APPLICATIONS

The present application claims the benefit of Indian Patent Application No. 202211027644, filed on May 13, 2022, which is hereby incorporated by reference herein in its entirety.

TECHNICAL FIELD

The present disclosure relates generally to combustor liners and, in particular, to a combustor liner having a plank and a hanger structure.

BACKGROUND

A gas turbine engine generally includes a fan and a core arranged in flow communication with one another with the core disposed downstream of the fan in the direction of flow through the gas turbine engine. The core of the gas turbine engine generally includes, in serial flow order, a compressor section, a combustion section, a turbine section, and an exhaust section. With multi-shaft gas turbine engines, the compressor section can include a high pressure compressor (HPC) disposed downstream of a low pressure compressor (LPC), and the turbine section can similarly include a low pressure turbine (LPT) disposed downstream of a high pressure turbine (HPT). With such a configuration, the HPC is coupled with the HPT via a high pressure shaft (HPS), and the LPC is coupled with the LPT via a low pressure shaft (LPS). In operation, at least a portion of air over the fan is provided to an inlet of the core. Such a portion of the air is progressively compressed by the LPC and then by the HPC until the compressed air reaches the combustion section. Fuel is mixed with the compressed air and burned within the combustion section to produce combustion gases. The combustion gases are routed from the combustion section through the HPT and then through the LPT. The flow of combustion gases through the turbine section drives the HPT and the LPT, each of which in turn drives a respective one of the HPC and the LPC via the HPS and the LPS. The combustion gases are then routed through the exhaust section, e.g., to the atmosphere. The LPT drives the LPS, which drives the LPC. In addition to driving the LPC, the LPS can drive the fan through a power gearbox, which allows the fan to be rotated at fewer revolutions per unit of time than the rotational speed of the LPS for greater efficiency.

The fuel that mixed with the compressed air and burned within the combustion section is delivered through a fuel nozzle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIGS. 6A to 6E show various geometrical configurations of structural elements of the skeleton mesh structure shown in FIGS. 3, 4 and 5, according to an embodiment of the present disclosure.

FIGS. 7A to 7E show various geometrical configurations of planks of the plurality of inner planks and the plurality of outer planks, according to an embodiment of the present disclosure.

DETAILED DESCRIPTION

Figure 1:
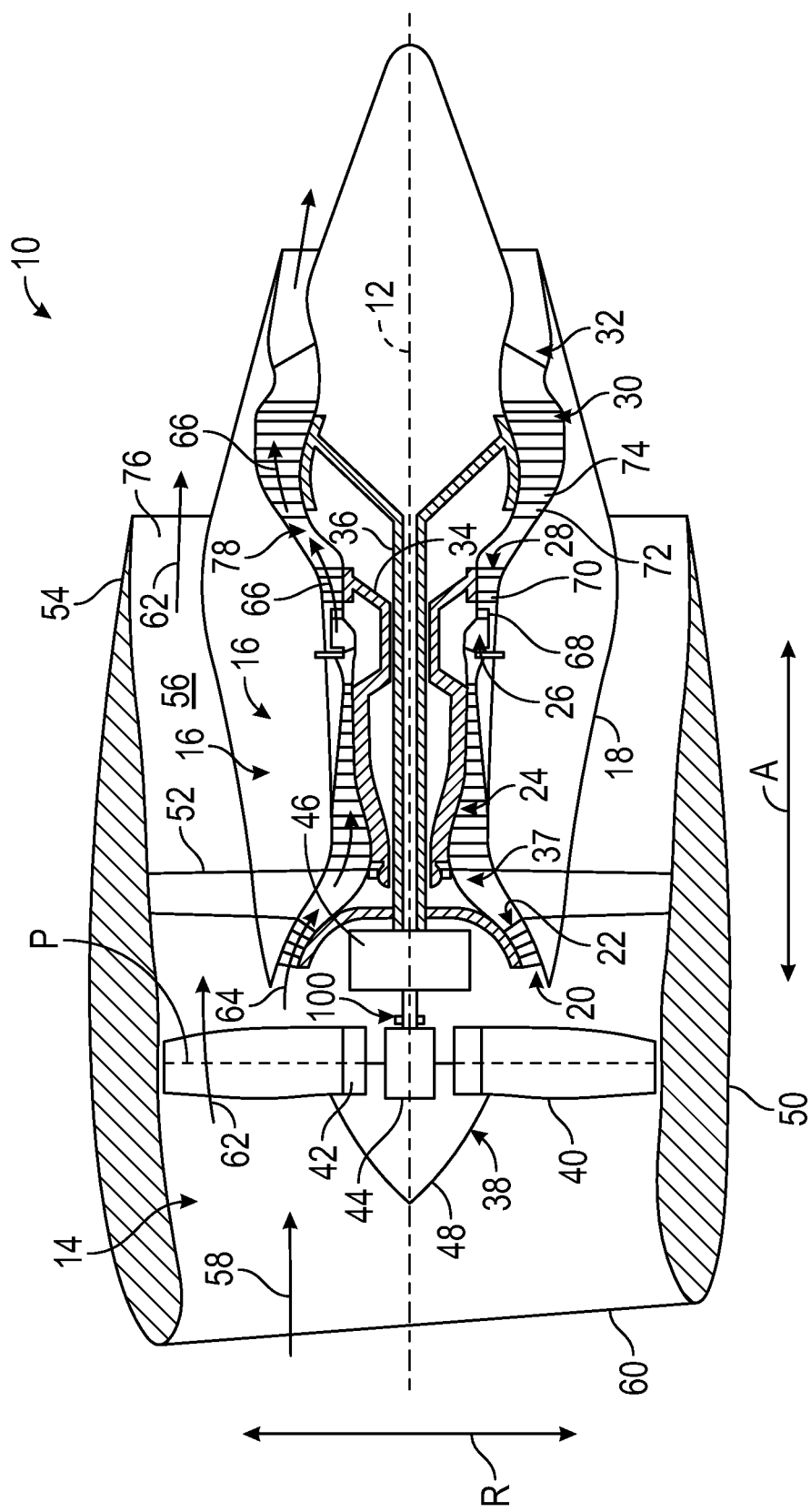
FIG. 1 is a schematic cross-sectional diagram of a turbine engine, according to an embodiment of the present disclosure.

Additional features, advantages, and embodiments of the present disclosure are set forth or apparent from a consideration of the following detailed description, drawings, and claims. Moreover, it is to be understood that both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and scope of the present disclosure.

In the following specification and the claims, reference may be made to a number of "optional" or "optionally" elements meaning that the subsequently described event or circumstance may occur or may not occur, and that the description includes instances in which the event occurs and instances in which the event does not occur.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the combustor. Moreover, the terms "radial" and "radially" refer to directions and orientations that extend substantially perpendicular to the centerline of the turbine engine or the fuel-air mixer assembly. In addition, as used herein, the terms "circumferential" and "circumferentially" refer to directions and orientations that extend arcuately about the centerline of the turbine engine or the fuel-air mixer assembly.

As will be further described in detail in the following paragraphs, a combustor is provided with improved liner durability under harsh heat and stress environment. The combustor includes a skeleton mesh structure (also referred to as hanger or truss) on which are mounted an inner liner and outer liner. The skeleton mesh structure acts as a supporting structure for the inner liner and outer liner as whole. In an embodiment, the skeleton mesh structure can be made of metal. The skeleton mesh structure together with the inner liner and the outer liner define the combustion chamber. The inner liner and the outer liner include a plurality of planks that include a plurality of inner planks and a plurality of outer planks, respectively. The inner planks cover the inner side of the skeleton mesh structure, and the outer planks cover the outer side of the skeleton mesh structure. In an embodiment, the inner planks can be made of ceramic material, Ceramic Matrix Composite (CMC) material, or a metal coated with CMC or Thermal Barrier Coating (TBC). The skeleton mesh structure together with the inner planks and the outer planks can improve durability due to hoop stress reduction or elimination while providing a lightweight liner configuration for the combustor. Furthermore, this liner configuration provides the additional benefit of being modular or segmented and, thus, relatively easy to repair.

FIG. 1 is a schematic cross-sectional diagram of a turbine engine 10, according to an embodiment of the present disclosure. More particularly, for the embodiment shown in FIG. 1, the turbine engine 10 is a high-bypass turbine engine 10. As shown in FIG. 1, the turbine engine 10 defines an axial direction A (extending parallel to a longitudinal centerline 12 provided for reference) and a radial direction R, generally perpendicular to the axial direction A. The turbine engine 10 includes a fan section 14 and a core turbine engine 16 disposed downstream from the fan section 14. The term "downstream" is used herein in reference to air flow direction 58.

The core turbine engine 16 depicted generally includes an outer casing 18 that is substantially tubular and that defines an annular inlet 20. The outer casing 18 encases, in serial flow relationship, a compressor section including a booster or a low pressure compressor (LPC) 22 and a high pressure compressor (HPC) 24, a combustion section 26, a turbine section including a high pressure turbine (HPT) 28 and a low pressure turbine (LPT) 30, and a jet exhaust nozzle section 32. A high pressure shaft (HPS) 34 drivingly connects the HPT 28 to the HPC 24. A low pressure shaft (LPS) 36 drivingly connects the LPT 30 to the LPC 22. The compressor section, the combustion section 26, the turbine section, and the jet exhaust nozzle section 32 together define a core air flow path 37.

For the embodiment depicted in FIG. 1, the fan section 14 includes a fan 38 with a variable pitch having a plurality of fan blades 40 spaced apart and coupled to a disk 42. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, the disk 42, and the actuation member 44 are together rotatable about the longitudinal centerline 12 (longitudinal axis) by the LPS 36 across a power gear box 46. The power gear box 46 includes a plurality of gears for adjusting or controlling the rotational speed of the fan 38 relative to the LPS 36 to a more efficient rotational fan speed.

The disk 42 is covered by a rotatable front hub 48 aerodynamically contoured to promote an air flow through the plurality of fan blades 40. Additionally, the fan section 14 includes an annular fan casing or nacelle 50 that circumferentially surrounds the fan 38 and/or at least a portion of the core turbine engine 16. The nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass air flow passage 56 therebetween.

During operation of the turbine engine 10, a volume of air flow 58 enters the turbine engine 10 in air flow direction 58 through an associated inlet 60 of the nacelle 50 and/or the fan section 14. As the volume of air passes across the fan blades 40, a first portion of the air as indicated by arrows 62 is directed or routed into the bypass air flow passage 56 and a second portion of the air as indicated by arrow 64 is directed or routed into the core air flow path 37, or, more specifically, into the LPC 22. The ratio between the first portion of air indicated by arrows 62 and the second portion of air indicated by arrows 64 is commonly known as a bypass ratio. The pressure of the second portion of air indicated by arrows 64 is then increased as the air is routed through the HPC 24 and into the combustion section 26, where the air is mixed with fuel and burned to provide combustion gases 66.

The combustion gases 66 are routed through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HPS 34, thus, causing the HPS 34 to rotate, thereby supporting operation of the HPC 24. The combustion gases 66 are then routed through the LPT 30 where a second portion of thermal and kinetic energy is extracted from the combustion gases 66 via sequential stages of LPT stator vanes 72 that are coupled to the outer casing 18 and LPT rotor blades 74 that are coupled to the LPS 36, thus, causing the LPS 36 to rotate, thus supporting operation of the LPC 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass air flow passage 56 before the air is exhausted from a fan nozzle exhaust section 76 of the turbine engine 10, also providing propulsive thrust. The HPT 28, the LPT 30, and the jet exhaust nozzle section 32 at least partially define a hot gas path 78 for routing the combustion gases 66 through the core turbine engine 16.

The turbine engine 10 is depicted in FIG. 1 by way of example only, and, in other exemplary embodiments, the turbine engine 10 may have any other suitable configuration. In still other exemplary embodiments, aspects of the present disclosure may be incorporated into any other suitable gas turbine engine. For example, in other exemplary embodiments, aspects of the present disclosure may be incorporated into, e.g., a turboshaft engine, a turboprop engine, a turbocore engine, a turbojet engine, etc.

Figure 2:
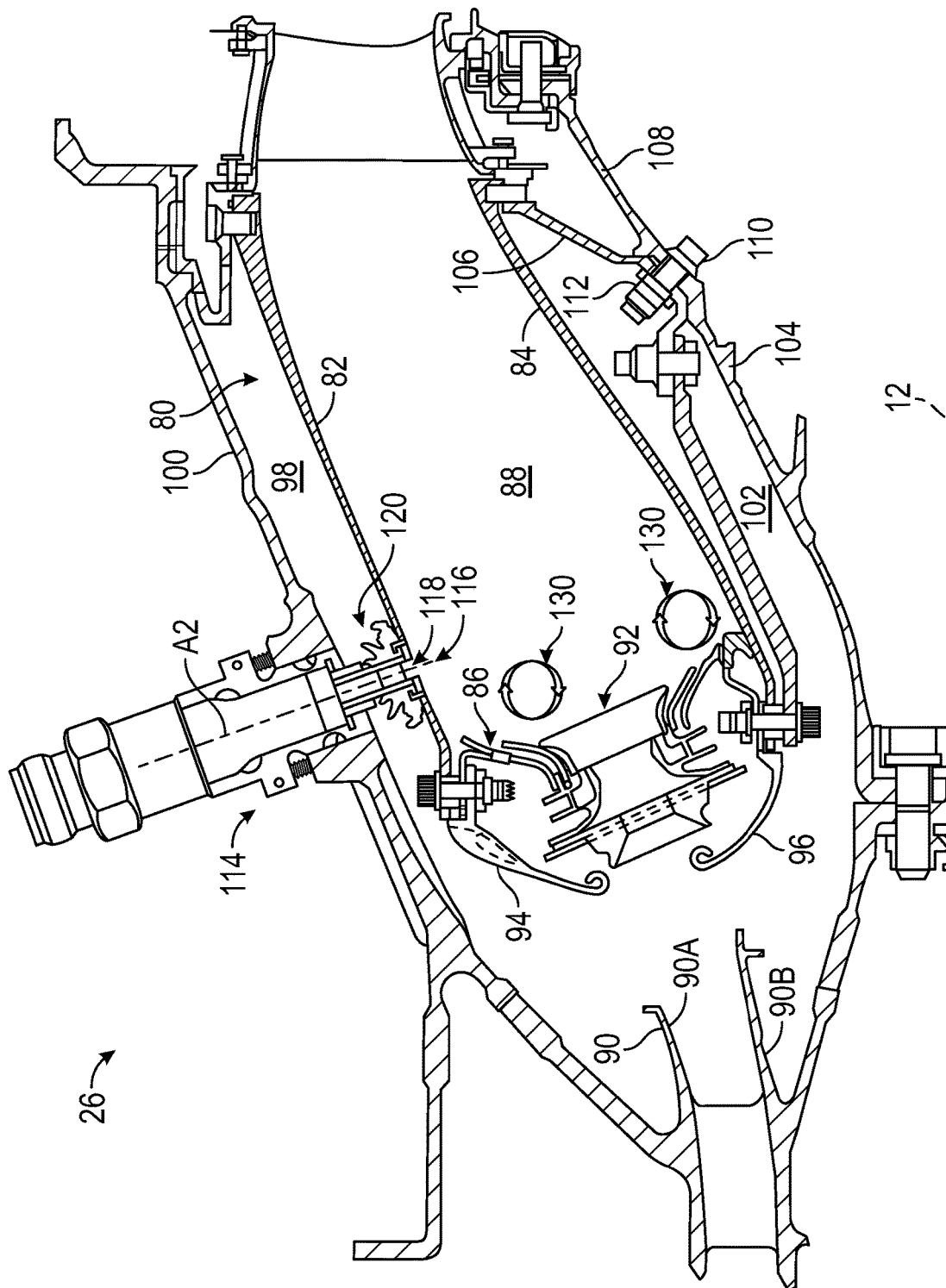
FIG. 2 is a schematic cross-sectional diagram of a combustor, according to an embodiment of the present disclosure.

FIG. 2 is a schematic, cross-sectional view of the combustion section 26 of the turbine engine 10 of FIG. 1, according to an embodiment of the present disclosure. The combustion section 26 generally includes a combustor 80 that generates the combustion gases discharged into the turbine section, or, more particularly, into the HPT 28. The combustor 80 includes an outer liner 82, an inner liner 84, and a dome 86. The outer liner 82, the inner liner 84, and the dome 86 together define a combustion chamber 88. In addition, a diffuser 90 is positioned upstream of the combustion chamber 88. The diffuser 90 has an outer diffuser wall 90A and an inner diffuser wall 90B. The inner diffuser wall 90B is closer to a longitudinal centerline 12. The diffuser 90 receives an air flow from the compressor section and provides a flow of compressed air to the combustor 80. In an embodiment, the diffuser 90 provides the flow of compressed air to a single circumferential row of fuel/air mixers 92. In an embodiment, the dome 86 of the combustor 80 is configured as a single annular dome, and the circumferential row of fuel/air mixers 92 are provided within openings formed in the dome 86 (air feeding dome or combustor dome). However, in other embodiments, a multiple annular dome can also be used.

In an embodiment, the diffuser 90 can be used to slow the high speed, highly compressed air from a compressor (not shown) to a velocity optimal for the combustor. Furthermore, the diffuser 90 can also be configured to limit the flow distortion as much as possible by avoiding flow effects like boundary layer separation. Like most other gas turbine engine components, the diffuser 90 is generally designed to be as light as possible to reduce weight of the overall engine.

A fuel nozzle (not shown) provides fuel to fuel/air mixers 92 depending upon a desired performance of the combustor 80 at various engine operating states. In the embodiment shown in FIG. 2, an outer cowl 94 (e.g., annular cowl) and an inner cowl 96 (e.g., annular cowl) are located upstream of the combustion chamber 88 so as to direct air flow into fuel/air mixers 92. The outer cowl 94 and the inner cowl 96 may also direct a portion of the flow of air from the diffuser 90 to an outer passage 98 defined between the outer liner 82 and an outer casing 100 and an inner passage 102 defined between the inner liner 84 and an inner casing 104. In addition, an inner support cone 106 is further shown as being connected to a nozzle support 108 using a plurality of bolts 110 and nuts 112. However, other combustion sections may include any other suitable structural configuration.

The combustor 80 is also provided with an igniter 114. The igniter 114 is provided to ignite the fuel/air mixture supplied to combustion chamber 88 of the combustor 80. The igniter 114 is attached to the outer casing 100 of the combustor 80 in a substantially fixed manner. Additionally, the igniter 114 extends generally along an axial direction A2, defining a distal end 116 that is positioned proximate to an opening in a combustor member of the combustion chamber 88. The distal end 116 is positioned proximate to an opening 118 within the outer liner 82 of the combustor 80 to the combustion chamber 88.

In an embodiment, the dome 86 of the combustor 80 together with the outer liner 82, the inner liner 84 and fuel/air mixers 92 form the combustion chamber 88 and define a swirling flow 130. The air flows through the fuel/air mixer assembly 92 as the air enters the combustion chamber 88. The role of the dome 86 and fuel/air mixer assembly 92 is to generate turbulence in the air flow to rapidly mix the air with the fuel. The swirler (also called mixer) establishes a local low pressure zone that forces some of the combustion products to recirculate, as illustrated in FIG. 2, creating needed high turbulence.

Figure 3A:
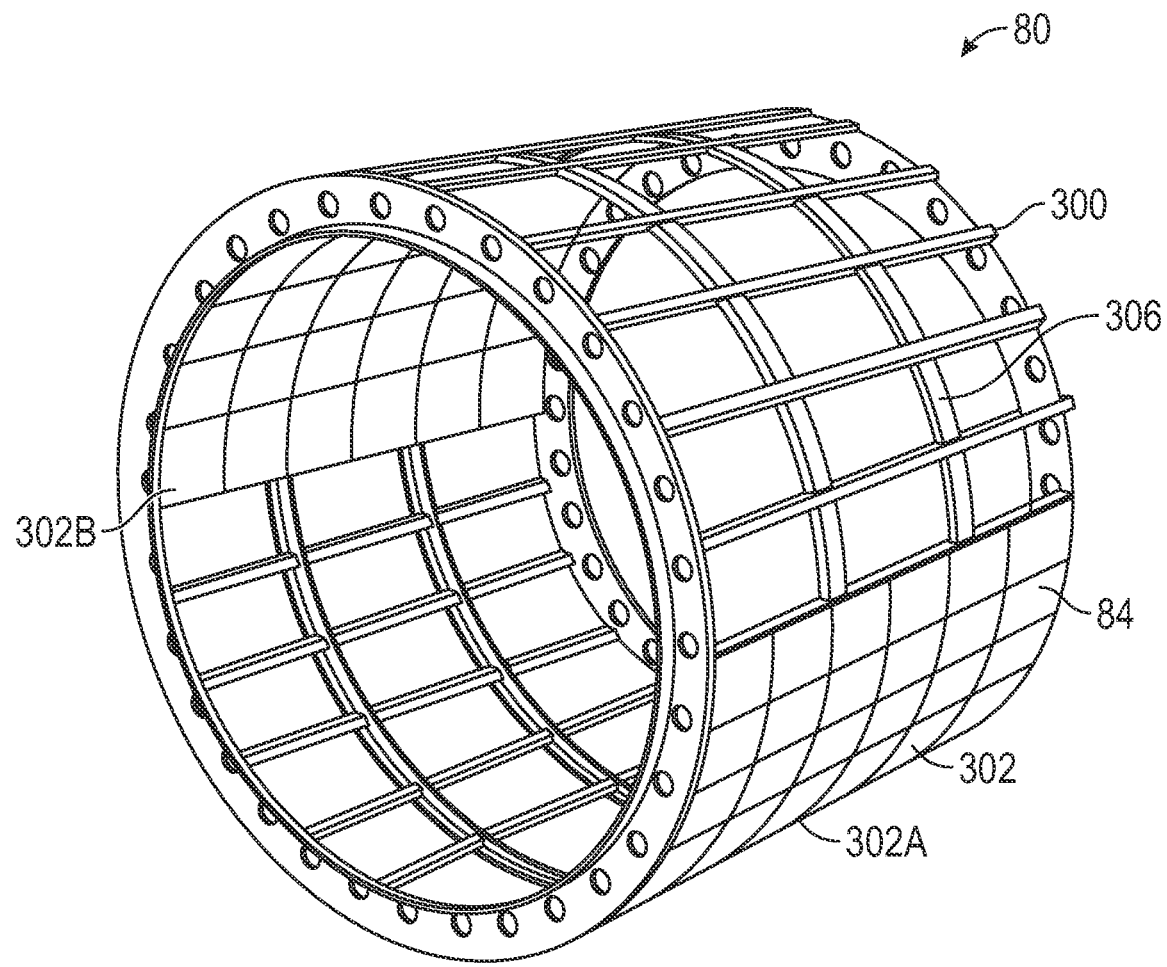
FIG. 3A is a schematic perspective view of a section of an inner liner of the combustor, according to an embodiment of the present disclosure.
Figure 3B:
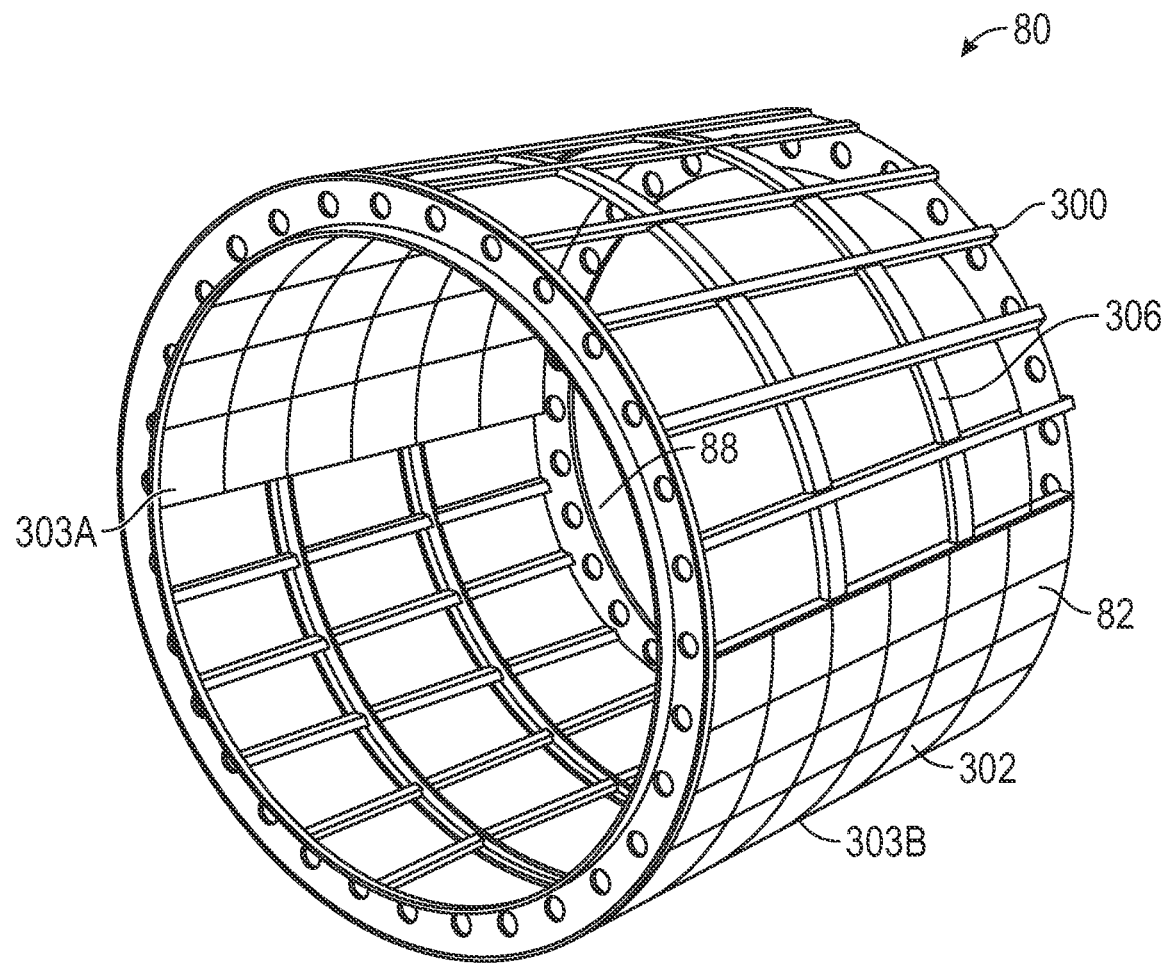
FIG. 3B is a schematic perspective view of a section of an outer liner of the combustor, according to an embodiment of the present disclosure.
Figure 3C:
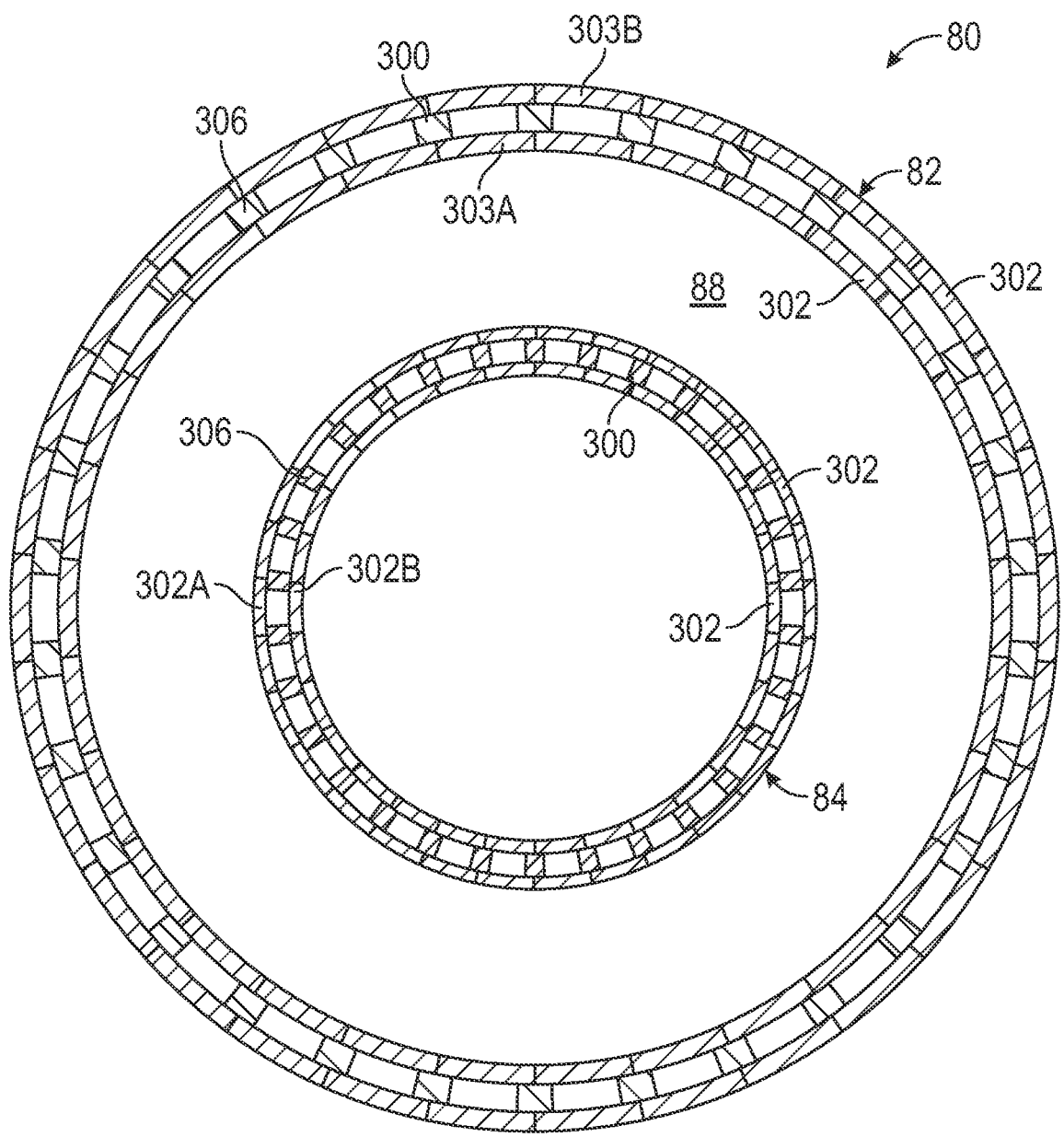
FIG. 3C is a schematic representation of a transversal cross section of the inner liner and the outer liner of the combustor, according to an embodiment of the present disclosure.

FIGS. 3A and 3B are schematic perspective views of a section of an inner liner 84 and an outer liner 82, respectively, of the combustor 80, according to an embodiment of the present disclosure. FIG. 3C is a schematic representation of a transversal cross section of the inner liner 84 and the outer liner 82 of the combustor 80, according to an embodiment of the present disclosure. The inner liner 84 and the outer liner 82 of the combustor 80 are shown having a cylindrical configuration. The combustor 80 comprises a skeleton mesh structure 300 (also referred to as a hanger or a truss) on which are mounted the inner liner 84 (shown in FIG. 3A and FIG. 3C) and the outer liner 82 (shown in FIG. 3B and FIG. 3C). The skeleton mesh structure 300 has a plurality of structural elements 306 and acts as a supporting structure for the inner liner 84 and the outer liner 82 as whole. In an embodiment, the skeleton mesh structure 300 is made of metal. The skeleton mesh structure 300 together with the inner liner 84 and the outer liner 82 define the combustion chamber 88. The inner liner 84 and the outer liner 82 include a plurality of planks 302. The plurality of planks 302 of the inner liner 84 include a plurality of inner planks 302A and a plurality of outer planks 302B. The plurality of inner planks 302A are mounted and cover the inner side of the skeleton mesh structure 300, and the outer planks 302B are mounted and cover the outer side of the skeleton mesh structure 300. The plurality of inner planks 302A are exposed to hot flames within the combustion chamber 88. The plurality of planks 302 of the outer liner 82 include a plurality of inner planks 303A and a plurality of outer planks 303B. The plurality of inner planks 303A are exposed to hot flames within the combustion chamber 88. In an embodiment, the plurality of inner planks 302A and/or the plurality of inner planks 303A are made of ceramic or are made of metal coated with a ceramic coating or thermal barrier coating (TBC) to enhance resistance to relatively high temperatures. In an embodiment, the plurality of inner planks 302A and/or the plurality of inner planks 303A can be made of ceramic material, Ceramic Matrix Composite (CMC) material, or a metal coated with CMC or TBC. In an embodiment, the plurality of outer planks 302B and/or the plurality of outer planks 303B can be made of metal or Ceramic Matrix Composite (CMC) and are used for cooling air regulation or to channel cooling airflow between the plurality of outer planks 302B and the plurality of inner planks 302A and/or between the plurality of outer planks 303B and the plurality of inner planks 303A to provide cooling to the plurality of inner planks 302A and/or the plurality of inner planks 303A by cooling airflow impingement. In embodiment, the outer planks 302B are thinner than the plurality of inner planks 302A and/or the outer planks 303B are thinner than the plurality of inner planks 303A.

The skeleton mesh structure 300 together with the plurality of inner planks 302A and the plurality of outer planks 302B can improve durability due to hoop stress reduction or elimination while providing a lightweight liner configuration for the combustor 80. For example, the present configuration provides at least 20% weight reduction compared to conventional combustors. Furthermore, the present configuration provides the additional benefit of being modular or segmented and, thus, relatively easy to repair. Indeed, if one or more planks in the plurality of inner planks 302A or the plurality of outer planks 302B is damaged, only the damaged one or more planks is replaced and not the entire inner liner 84 or the entire outer liner 82. Furthermore, the present configuration lends itself to be relatively easy to inspect and to repair. All these benefits result in overall cost savings.

Figure 4:
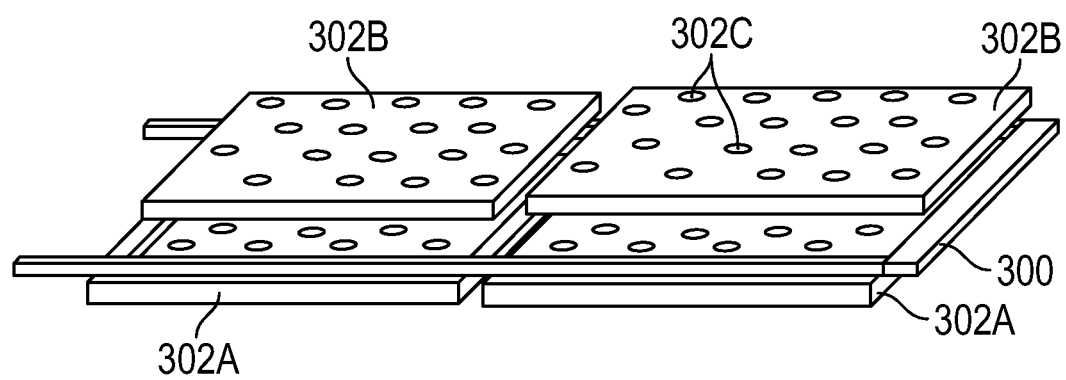
FIG. 4 is a schematic perspective view of a section of an inner liner and an outer liner of the combustor, according to an embodiment of the present disclosure.

FIG. 4 is a schematic perspective view of a section of the inner liner 84 and the outer liner 82 of the combustor 80, according to an embodiment of the present disclosure. As shown in FIG. 4, the plurality of planks 302, which include the plurality of inner planks 302A and the plurality of outer planks 302B, are mounted to the skeleton mesh structure 300. The plurality of inner planks 302A and the plurality of outer planks 302B include a plurality of holes 302C. As shown in FIG. 4, the plurality of inner planks 302A and a plurality of outer planks 302B are mounted on opposite sides of the skeleton mesh structure 300. The plurality of holes 302C are distributed along a surface of the plurality of inner planks 302A and a plurality of outer planks 302B to allow air to enter to the combustion chamber 88 and/or to allow air to circulate within a gap G between the plurality of inner planks 302A and the outer planks 302B (shown in FIG. 5).

Figure 5:
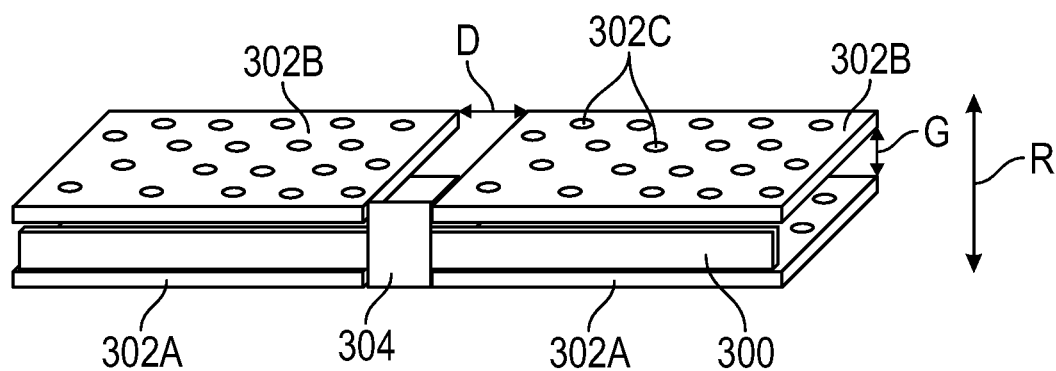
FIG. 5 is a schematic perspective view showing details of the interconnection between a plurality of the planks and a skeleton mesh structure of the combustor, according to an embodiment of the present disclosure.

FIG. 5 is a schematic perspective view showing details of the interconnection between the plurality of the planks 302 and the skeleton mesh structure 300, according to an embodiment of the present disclosure. As shown in FIG. 5, the plurality of inner planks 302A and a plurality of outer planks 302B are mounted on opposite sides of the skeleton mesh structure 300 and the plurality of inner planks 302A and the plurality of outer planks 302B are spaced apart radially from each other by a gap G. In addition, each pair of contiguous planks of the plurality of inner planks 302A and the plurality of outer planks 302B are also separated apart sidewise by a distance D. The skeleton mesh structure 300 includes a separator feature 304 to maintain the distance between each pair of contiguous planks of the plurality of inner planks 302A and the plurality of outer planks 302B.

FIGS. 6A to 6E show various geometrical configurations of structural elements of the skeleton mesh structure 300 shown in FIGS. 3, 4 and 5, according to an embodiment of the present disclosure. The skeleton mesh structure 300 can include a plurality of structural elements 306 that mesh together to form the skeleton mesh structure 300 shown in FIGS. 3, 4 and 5. As shown in FIGS. 6A to 6E, each of the plurality of structural elements 306 can have any desired geometrical shape, including any polygonal shape such as a square shape or a rectangular shape, a rhombus shape, a triangular shape, a pentagonal shape, a hexagonal shape, or a more complex shape, etc. Each of the structural elements 306 can have a plurality of sides defining a hollow face.

FIGS. 7A to 7E show various geometrical configurations of planks of the plurality of inner planks 302A and the plurality of outer planks 302B, according to an embodiment of the present disclosure. In an embodiment, as shown in FIGS. 7A to 7E, each of the plurality of inner planks 302A and the plurality of outer planks 302B can also have a geometrical shape that matches a corresponding shape of each of the plurality of structural elements 306 shown in FIGS. 6A to 6E. Each of the plurality of inner planks 302A and the plurality of outer planks 302B is essentially a filled shape. The filled shape is provided with a plurality of holes 302C. The filled shape (shown in FIGS. 7A to 7E) of each or the plurality of inner planks 302A and each of the plurality of outer planks 302B can be mounted to a corresponding hollow shape (shown in FIGS. 6A to 6E) of the plurality of structural elements 306. In an embodiment, the plurality of inner planks 302A and/or the plurality of outer planks 302B can have a slight curvature to follow or comply to the curvature of the skeleton mesh structure 300.

The plurality of inner planks 302A and the plurality of outer planks 302B can be mounted to the plurality of structural elements 306 of the skeleton mesh structure 300 using various fastening techniques similar to covering, for example, a truss structure of a bridge, a building, aircraft fuselage, rocket structures, etc.

Figure 8A:
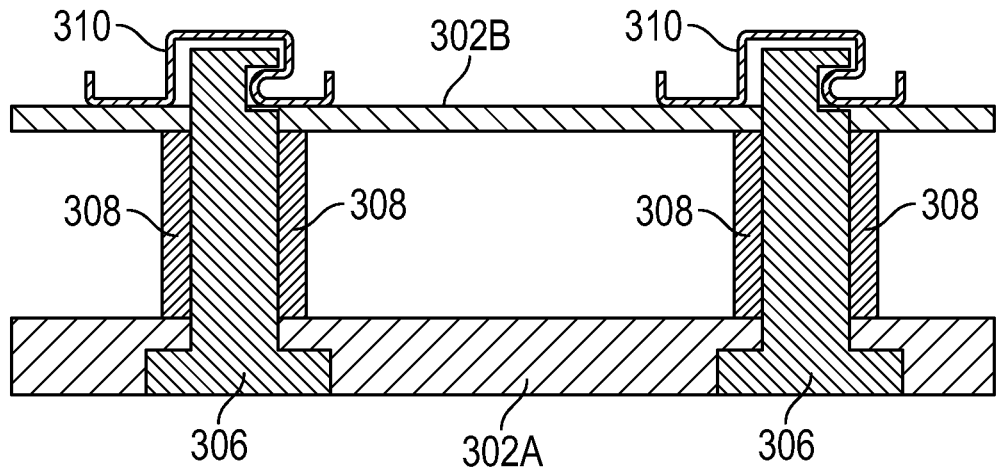
FIG. 8A is schematic cross-sectional view showing the interconnection between the plurality of inner planks and the plurality of outer planks, and the skeleton mesh structure, according to an embodiment of the present disclosure.

FIG. 8A is schematic cross-sectional view showing the interconnection between the plurality of inner planks 302A and the plurality of outer planks 302B, and the skeleton mesh structure 300, according to an embodiment of the present disclosure. As shown in FIG. 8A, the plurality of inner planks 302A are connected to the plurality of structural elements 306 of the skeleton mesh structure 300. The combustor 80 (shown in FIGS. 2 and 3) further includes a plurality of radial spacers 308 that are positioned above the plurality of inner planks 302A and around the plurality of structural elements 306. The plurality of outer planks 302B are provided on the plurality of radial spacers 308. A plurality of connector clips 310 (e.g., clips) are used to couple the plurality of outer planks 302B to the plurality of structural elements 306. As shown in FIG. 8A, the plurality of outer planks 302B are thinner than the plurality of inner planks 302A. In an embodiment, as shown in FIG. 8A, the plurality of inner planks 302A and the plurality of outer planks 302B have different thicknesses. For example, the plurality of inner planks 302A are thicker than the plurality of outer planks 302B.

Figure 8B:
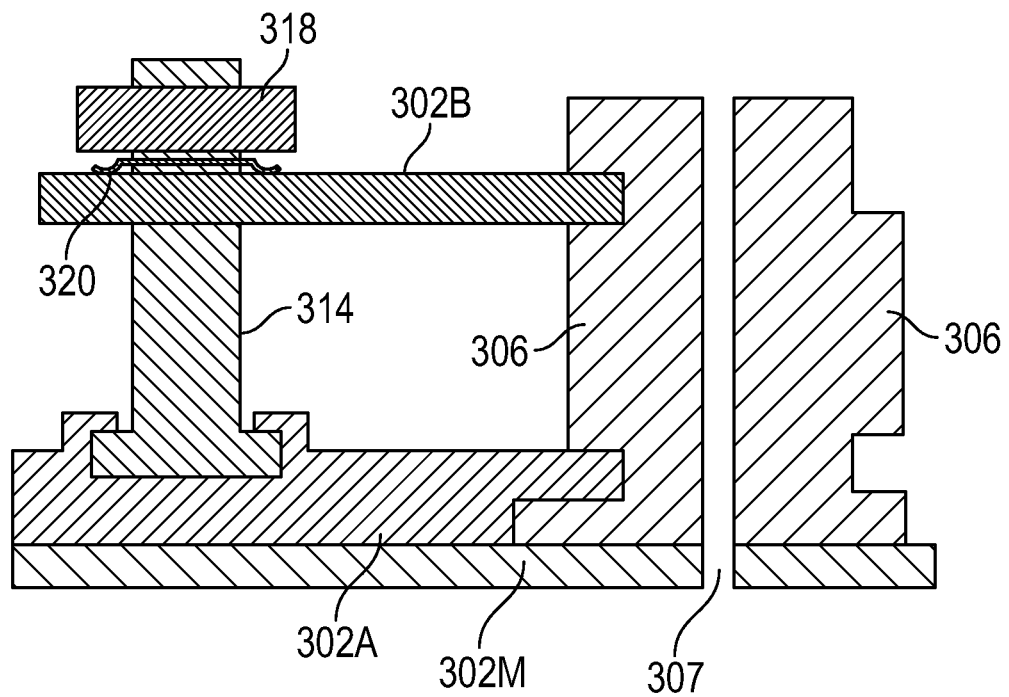
FIG. 8B is a schematic cross-sectional view showing the interconnection between the plurality of inner planks and the plurality of outer planks, and the skeleton mesh structure, according to another embodiment of the present disclosure.

FIG. 8B is a schematic cross-sectional view showing the interconnection between the plurality of inner planks 302A and the plurality of outer planks 302B, and the skeleton mesh structure 300, according to another embodiment of the present disclosure. As shown in FIG. 8B, the plurality of inner planks 302A are connected to the plurality of structural elements 306 of the skeleton mesh structure 300. A plurality of links 314 are connected to the plurality of inner planks 302A. The plurality of outer planks 302B are coupled to the plurality of links 314 and to the plurality of structural elements 306 of the skeleton mesh structure 300. A plurality of fasteners 318 are used to couple the plurality of outer planks 302B to the plurality of links 314. A plurality of resilient elements 320 (e.g., springs) can be provided between the plurality of fasteners 318 and the plurality of links 314 to push the plurality of outer planks 302B against the plurality of links 314. In an embodiment, as shown in FIG. 8B, a cooling air passageway 307 is provided within each of the plurality of structural elements 306. For example, the configurations shown in FIGS. 8A and 8B, provide an inter-locking system of the plurality of inner planks 302A (e.g., sliding planks) and plurality of outer planks 302B (e.g., sliding planks). In addition, these configurations also provide the use of C-clips to attach the plurality of inner planks 302A and the plurality of outer planks 302B to the plurality of structural elements 306 of the skeleton mesh structure 300 instead of using bolts. A material layer 302M can be provided for coating the plurality of inner planks 302A.

Figure 8C:
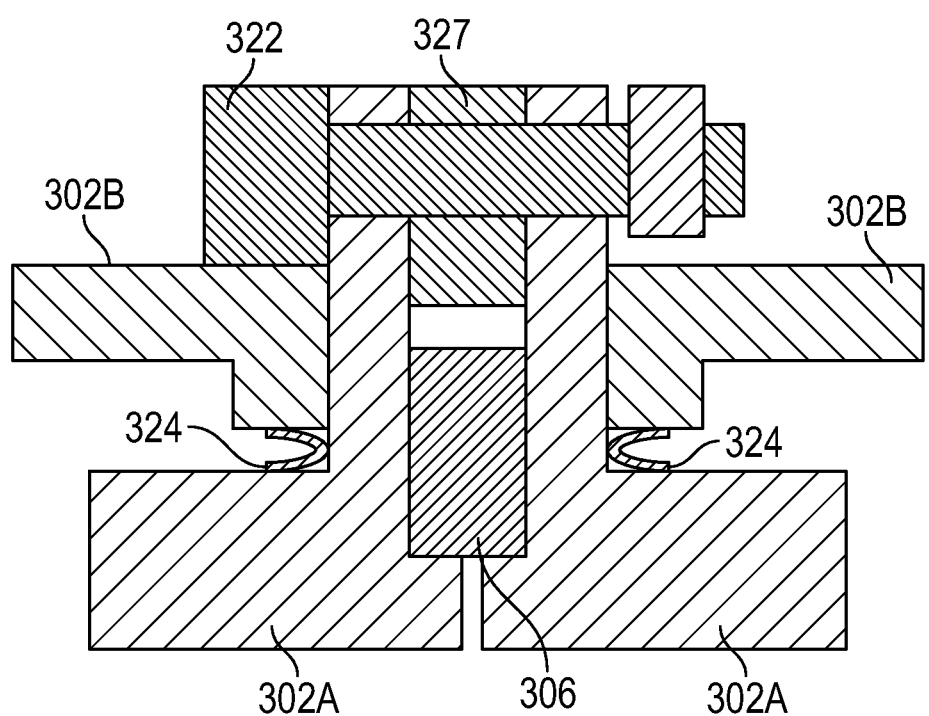
FIG. 8C is schematic cross-sectional view showing the interconnection between the plurality of inner planks and the plurality of outer planks and the skeleton mesh structure 300, according to yet another embodiment of the present disclosure.

FIG. 8C is schematic cross-sectional view showing the interconnection between the plurality of inner planks 302A and the plurality of outer planks 302B and the skeleton mesh structure 300, according to yet another embodiment of the present disclosure. As shown in FIG. 8C, the plurality of inner planks 302A are connected to the plurality of structural elements 306 of the skeleton mesh structure 300. The plurality of outer planks 302B are coupled to the plurality of inner planks 302A. A plurality of fasteners 322 are used to couple the plurality of inner planks 302A to the plurality of structural elements 306. A plurality of spacers resilient members 324 (e.g., springs) can be provided between the plurality of inner planks 302A and the plurality of outer planks 302B. In an embodiment, as shown in FIG. 8C, a spacer 327 are provided between two portions of the plurality of inner planks 302A for linking the two portions using the plurality of fasteners 322.

The skeleton mesh structure together with the inner planks and the outer planks can improve durability due to hoop stress reduction or elimination while providing a lightweight liner configuration for the combustor. Furthermore, this liner configuration provides the additional benefit of being modular or segmented and, thus, relatively easy to repair or replace.

As can be appreciated from the discussion above, a combustor includes a skeleton mesh structure having a plurality of structural elements configured to mesh together to form the skeleton mesh structure. The combustor also includes an inner liner and an outer liner mounted to the skeleton mesh structure to define a combustion chamber. The inner liner includes a plurality of inner planks mounted to an inner side of the inner liner and a plurality of outer planks mounted to an outer side of the inner liner. The outer liner includes a plurality of inner planks mounted to an inner side of the outer liner and a plurality of outer planks mounted to the outer side of the outer liner.

The combustor according to any preceding clause, the plurality of inner planks and the plurality of outer planks being spaced apart radially from each other by a gap.

The combustor according to any preceding clause, each pair of contiguous planks of the plurality of inner planks and each pair of contiguous planks of the plurality of outer planks being separated apart using a separator.

The combustor according to any preceding clause, the plurality of structural elements having a hollow polygonal shape with a plurality of sides defining a hollow face.

The combustor according to any preceding clause, the plurality of inner planks and the plurality of outer planks having a filled polygonal shape that matches the hollow polygonal shape of the plurality of structural elements.

The combustor according to any preceding clause, further including radial spacers provided around the plurality of structural elements. The plurality of inner planks are connected to the plurality of structural elements. The radial spacers are provided on the plurality of inner planks. The plurality of outer planks are provided on the radial spacers. The plurality of outer planks are coupled to the plurality of structural elements using a plurality of clips.

The combustor according to any preceding clause, further including a plurality of links. The plurality of inner planks and the plurality of outer planks are connected to the plurality of structural elements. The plurality of links are connected to the plurality of inner planks. The plurality of outer planks are coupled to the plurality of links using a plurality of fasteners.

The combustor according to any preceding clause, each of the plurality of structural elements having a cooling air passageway.

The combustor according to any preceding clause, the plurality of inner planks being connected to the plurality of structural elements using a plurality of fasteners. The plurality of outer planks are coupled to the plurality of inner planks. The plurality of outer planks are spaced apart from the plurality of inner planks using a plurality of spacers.

The combustor according to any preceding clause, the plurality of inner planks further including a ceramic coating layer deposited on the inner side of the plurality of inner planks.

The combustor according to any preceding clause, the plurality of inner planks and the plurality of outer planks having different thicknesses.

The combustor according to any preceding clause, the plurality of inner planks and the plurality of outer planks being curved to comply to a curvature of the skeleton mesh structure.

Another aspect of the present disclosure is to provide a turbine engine including a combustor. The combustor includes a skeleton mesh structure having a plurality of structural elements configured to mesh together to form the skeleton mesh structure. The combustor also includes an inner liner and an outer liner mounted to the skeleton mesh structure to define a combustion chamber. The inner liner includes a plurality of inner planks mounted to an inner side of the inner liner and a plurality of outer planks mounted to an outer side of the inner liner. The outer liner includes a plurality of inner planks mounted to an inner side of the outer liner and a plurality of outer planks mounted to the outer side of the outer liner.

The turbine engine according to any preceding clause, the plurality of inner planks and the plurality of outer planks being spaced apart radially from each other by a gap.

The turbine engine according to any preceding clause, each pair of contiguous planks of the plurality of inner planks and each pair of contiguous planks of the plurality of outer planks being separated apart using a separator.

The turbine engine according to any preceding clause, the plurality of structural elements having a hollow polygonal shape with a plurality of sides defining a hollow face.

The turbine engine according to any preceding clause, the plurality of inner planks and the plurality of outer planks having a filled polygonal shape that matches the hollow polygonal shape of the plurality of structural elements.

The turbine engine according to any preceding clause, further including radial spacers provided around the plurality of structural elements. The plurality of inner planks are connected to the plurality of structural elements. The radial spacers are provided on the plurality of inner planks. The plurality of outer planks are provided on the radial spacers. The plurality of outer planks are coupled to the plurality of structural elements using a plurality of clips.

The turbine engine according to any preceding clause, further including a plurality of links. The plurality of inner planks and the plurality of outer planks are connected to the plurality of structural elements. The plurality of links are connected to the plurality of inner planks. The plurality of outer planks are coupled to the plurality of links using a plurality of fasteners.

Although the foregoing description is directed to certain embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor comprising:
   a skeleton mesh structure comprising a plurality of structural elements configured to mesh together to form the skeleton mesh structure; and
   an inner liner and an outer liner mounted to the skeleton mesh structure to define a combustion chamber,
   the inner liner comprising a first plurality of inner planks mounted to a first inner side of the skeleton mesh structure and a first plurality of outer planks mounted to a first outer side of the skeleton mesh structure, and
   the outer liner comprising a second plurality of inner planks mounted to a second inner side of the skeleton mesh structure and a second plurality of outer planks mounted to a second outer side of the skeleton mesh structure.

2. The combustor according to claim 1, wherein (i) the first plurality of inner planks and the first plurality of outer planks of the inner liner are spaced apart radially from each other by a gap, or (ii) the second plurality of inner planks and the second plurality of outer planks of the outer liner are spaced apart radially from each other by a gap, or both (i) and (ii).

3. The combustor according to claim 1, wherein (i) a pair of contiguous planks of the first plurality of inner planks of the inner liner and a pair of contiguous planks of the first plurality of outer planks of the inner liner are spaced apart using a separator, or (ii) a pair of contiguous planks of the second plurality of inner planks of the outer liner and a pair of contiguous planks of the second plurality of outer planks of the outer liner are spaced apart using a separator, or both (i) and (ii).

4. The combustor according to claim 1, wherein the plurality of structural elements have a hollow polygonal shape with a plurality of sides defining a hollow face.

5. The combustor according to claim 4, wherein (i) the first plurality of inner planks and the first plurality of outer planks of the inner liner have a filled polygonal shape that matches the hollow polygonal shape of the plurality of structural elements, or (ii) the second plurality of inner planks and the second plurality of outer planks of the outer liner have a filled polygonal shape that matches the hollow polygonal shape of the plurality of structural elements, or both (i) and (ii).

6. The combustor according to claim 1, wherein (i) the first plurality of inner planks and the first plurality of outer planks of the inner liner have a filled polygonal shape and comprise a plurality of holes, or (ii) the second plurality of inner planks and the second plurality of outer planks of the outer liner have a filled polygonal shape and comprise a plurality of holes, or both (i) and (ii).

7. The combustor according to claim 1, further comprising radial spacers provided around the plurality of structural elements, (i) the first plurality of inner planks of the inner liner being connected to the plurality of structural elements, the radial spacers being provided on the first plurality of inner planks of the inner liner, the first plurality of outer planks of the inner liner being provided on the radial spacers, and the first plurality of outer planks of the inner liner being coupled to the plurality of structural elements using a plurality of clips, or (ii) the second plurality of inner planks of the outer liner being connected to the plurality of structural elements, the radial spacers being provided on the second plurality of inner planks of the outer liner, the second plurality of outer planks of the outer liner being provided on the radial spacers, and the second plurality of outer planks of the outer liner being coupled to the plurality of structural elements using a plurality of clips, or both (i) and (ii).

8. The combustor according to claim 1, further comprising a plurality of links, (i) the first plurality of inner planks of the inner liner and the first plurality of outer planks of the inner liner being connected to the plurality of structural elements, the plurality of links being connected to the first plurality of inner planks of the inner liner, and the first plurality of outer planks of the inner liner being coupled to the plurality of links using a plurality of fasteners, or (ii) the second plurality of inner planks of the outer liner and the second plurality of outer planks of the outer liner being connected to the plurality of structural elements, the plurality of links being connected to the second plurality of inner planks of the outer liner, and the second plurality of outer planks of the outer liner being coupled to the plurality of links using a plurality of fasteners, or both (i) and (ii).

9. The combustor according to claim 1, wherein each of the plurality of structural elements has a cooling air passageway.

10. The combustor according to claim 1, wherein (i) the first plurality of inner planks of the inner liner are connected to the plurality of structural elements using a plurality of fasteners, the first plurality of outer planks of the inner liner are coupled to the first plurality of inner planks of the inner liner, and the first plurality of outer planks of the inner liner are spaced apart from the first plurality of inner planks of the inner liner using a plurality of spacers, or (ii) the second plurality of inner planks of the outer liner are connected to the plurality of structural elements using a plurality of fasteners, the second plurality of outer planks of the outer liner are coupled to the second plurality of inner planks of the outer liner, and the second plurality of outer planks of the outer liner are spaced apart from the second plurality of inner planks of the outer liner using a plurality of spacers, or both (i) and (ii).

11. The combustor according to claim 1, wherein (i) the first plurality of inner planks of the inner liner further comprise a ceramic coating or thermal barrier coating layer deposited on an inner side of the first plurality of inner planks of the inner liner, or (ii) the second plurality of inner planks of the outer liner further comprise a ceramic coating or thermal barrier coating layer deposited on an inner side of the second plurality of inner planks of the outer liner, or both (i) and (ii).

12. The combustor according to claim 1, wherein (i) the first plurality of inner planks of the inner liner and the first plurality of outer planks of the inner liner have different thicknesses, or (ii) the second plurality of inner planks of the outer liner and the second plurality of outer planks of the outer liner have different thicknesses, or both (i) and (ii).

13. The combustor according to claim 1, wherein (i) the first plurality of inner planks of the inner liner and the first plurality of outer planks of the inner liner are curved to comply to a curvature of the skeleton mesh structure, or (ii) the second plurality of inner planks of the outer liner and the second plurality of outer planks of the outer liner are curved to comply to a curvature of the skeleton mesh structure, or both (i) and (ii).

14. A turbine engine comprising:
    a combustor comprising:

(a) a skeleton mesh structure comprising a plurality of structural elements configured to mesh together to form the skeleton mesh structure; and
(b) an inner liner and an outer liner mounted to the skeleton mesh structure to define a combustion chamber, the inner liner comprising a first plurality of inner planks mounted to a first inner side of the skeleton mesh structure and a first plurality of outer planks mounted to a first outer side of the skeleton mesh structure, and the outer liner comprising a second plurality of inner planks mounted to a second inner side of the skeleton mesh structure and a second plurality of outer planks mounted to a second outer side of the skeleton mesh structure.

15. The turbine engine according to claim 14, wherein (i) the first plurality of inner planks of the inner liner and the first plurality of outer planks of the inner liner are spaced apart radially from each other by a gap, or (ii) the second plurality of inner planks of the outer liner and the second plurality of outer planks of the outer liner are spaced apart radially from each other by a gap, or both (i) and (ii).

16. The turbine engine according to claim 14, wherein (i) a pair of contiguous planks of the first plurality of inner planks of the inner liner and a pair of contiguous planks of the first plurality of outer planks of the inner liner are spaced apart using a separator, or (ii) a pair of contiguous planks of the second plurality of inner planks of the outer liner and a pair of contiguous planks of the second plurality of outer planks of the outer liner are spaced apart using a separator, or both (i) and (ii).

17. The turbine engine according to claim 14, wherein the plurality of structural elements have a hollow polygonal shape with a plurality of sides defining a hollow face.

18. The turbine engine according to claim 17, wherein (i) the first plurality of inner planks of the inner liner and the first plurality of outer planks of the inner liner have a filled polygonal shape that matches the hollow polygonal shape of the plurality of structural elements, or (ii) the second plurality of inner planks of the outer liner and the second plurality of outer planks of the outer liner have a filled polygonal shape that matches the hollow polygonal shape of the plurality of structural elements, or both (i) and (ii).

19. The turbine engine according to claim 14, further comprising radial spacers provided around the plurality of structural elements, (i) the first plurality of inner planks of the inner liner being connected to the plurality of structural elements, the radial spacers being provided on the first plurality of inner planks of the inner liner, the first plurality of outer planks of the inner liner being provided on the radial spacers, and the first plurality of outer planks of the inner liner being coupled to the plurality of structural elements using a plurality of clips, or (ii) the second plurality of inner planks of the outer liner being connected to the plurality of structural elements, the radial spacers being provided on the second plurality of inner planks of the outer liner, the second plurality of outer planks of the outer liner being provided on the radial spacers, and the second plurality of outer planks of the outer liner being coupled to the plurality of structural elements using a plurality of clips, or both (i) and (ii).

20. The turbine engine according to claim 14, further comprising a plurality of links, (i) the first plurality of inner planks of the inner liner and the first plurality of outer planks of the inner liner being connected to the plurality of structural elements, the plurality of links being connected to the first plurality of inner planks of the inner liner, and the first plurality of outer planks of the inner liner being coupled to the plurality of links using a plurality of fasteners, or (ii) the second plurality of inner planks of the outer liner and the second plurality of outer planks of the outer liner being connected to the plurality of structural elements, the plurality of links being connected to the second plurality of inner planks of the outer liner, and the second plurality of outer planks of the outer liner being coupled to the plurality of links using a plurality of fasteners, or both (i) and (ii).

* * * * *